United States Patent [19]

Comyns-Carr et al.

[11] 4,289,455

[45] Sep. 15, 1981

[54] DEVICES FOR EXTRACTING ENERGY FROM WAVES

[75] Inventors: Cecil A. Comyns-Carr, Bath; Michael J. Platts, Willingham, both of England

[73] Assignee: The Secretary of State for Energy in Her Britannic Majesty's Government of the United Kingdom of Great Britain and Northern Ireland, London, England

[21] Appl. No.: 92,181

[22] Filed: Nov. 7, 1979

[30] Foreign Application Priority Data

Nov. 17, 1978 [GB] United Kingdom ............... 45113/78

[51] Int. Cl.³ .............................................. F03E 13/12
[52] U.S. Cl. ..................................... 417/332; 60/500; 60/501; 417/473
[58] Field of Search ............... 417/330, 331, 332, 473; 60/495, 500, 501

[56] References Cited

U.S. PATENT DOCUMENTS

| 862,867 | 8/1907 | Eggleston | 417/390 |
| 1,078,323 | 11/1943 | Trull | 417/332 |
| 2,334,525 | 11/1943 | Zadig | 417/473 |
| 4,077,213 | 3/1978 | Hagen | 60/500 |

FOREIGN PATENT DOCUMENTS

| 2382596 | 9/1978 | France | 417/330 |
| 1448204 | 9/1976 | United Kingdom . | |

Primary Examiner—Richard E. Gluck
Attorney, Agent, or Firm—William R. Hinds

[57] ABSTRACT

The invention relates to a device for extracting energy from waves and having a pump arranged to be operated by relative motion between members of the device in response to waves. The pump according to the invention has a pump body with a flexible portion extending between the members so as to define a pump chamber having a volume which varies as a result of the aforesaid relative motion. In one form of the invention the pump body is provided by a tubular bellows comprising elastomeric material. A plurality of such pumps may be disposed between the members, each pump being activated by said relative motion.

3 Claims, 4 Drawing Figures

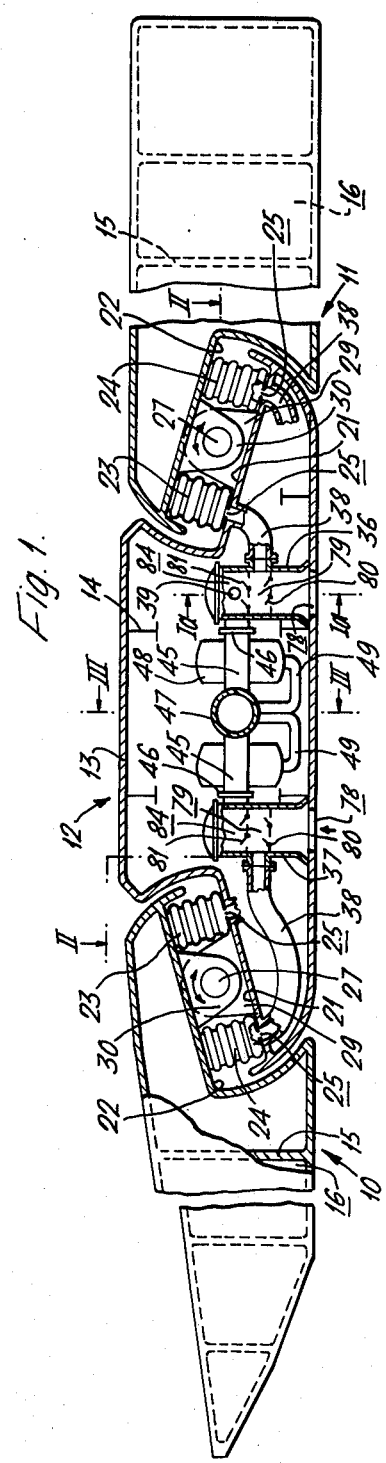
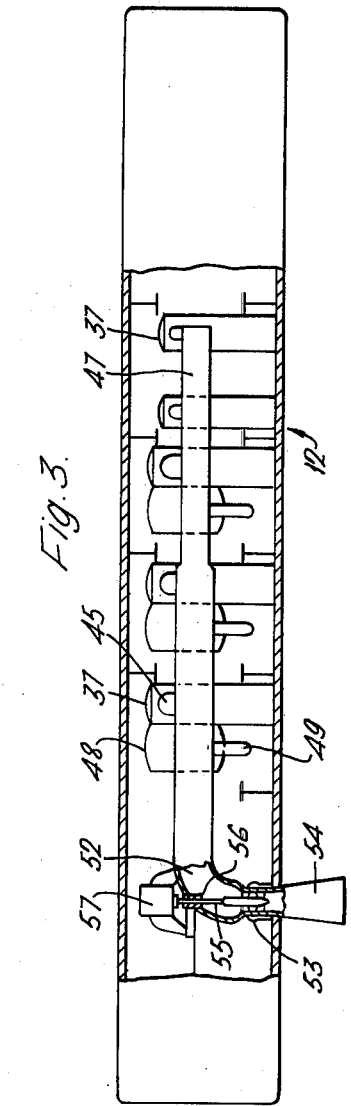
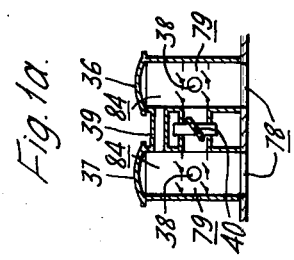

DEVICES FOR EXTRACTING ENERGY FROM WAVES

This invention relates to devices for extracting energy from waves, and more particularly to a device in which relative motion between members of the device in response to waves is used to perform useful work.

An article in "Chartered Mechanical Engineer", September 1978 pp 41-47, published by the Institution of Mechanical Engineers, London, England, examined the potential of wave power in the seas around the United Kingdom. One of the devices mentioned in this article and based on a concept proposed by Sir Christopher Cockerell comprises buoyant members hinged together such that relative motion between the members in response to waves operates several pumps to displace a fluid and thereby performs useful work, this device being hereinafter referred to as "the Cockerell Raft". The Cockerell Raft is the subject of British Pat. No. 1,448,204 to which reference can be made, and an article on the development of wave energy systems using the principle of the Cockerell Raft appeared in "New Scientist" (pp 241-243) 1st May 1975.

According to the present invention, a device for extracting energy from waves comprises two members hinged one to another so as to allow relative motion between the members in response to waves, at least one of the members being of buoyant construction, and at least one pump connected between the members for displacing fluid in response to said relative motion, said pump comprising a pump body having a pump chamber defined at least in part by a flexible portion thereof extending between the members so that the relative motion of the members varies the volume of the pump chamber and thereby displaces said fluid.

The device may include a third member hinged to one of said two members so as to allow relative motion between the third member and said one member in response to waves, and at least one said pump connected between the one member and the third member for displacing fluid in response to said relative motion.

Preferably, two said pumps are connected one on each side of the centre about which two of the said members are hinged together so that as one pump body is extended by said relative motion of the two said members and increases the volume of the pump chamber thereof the other pump body is compressed by said relative motion and decreases the volume of the pump chamber thereof.

A common manifold may be provided for receiving the fluid displaced by each pump, and desirably the device includes valve means for diverting the fluid discharged from a selected said pump away from the common manifold.

Preferably, said flexible portion comprises a tubular portion of bellows form and of composite construction.

The fluid may be provided by a closed system, in which system the fluid is arranged to be recycled by the pump(s).

The invention will now be further described by way of example only with reference to the accompanying drawings, in which:

FIG. 1 shows a sectional elevation of a Cockerell Raft incorporating the invention;

FIG. 1a shows a fragmentary sectional view on the line Ia—Ia of FIG. 1;

FIG. 3 shows a view in the direction of line III—III of FIG. 1.

Figure 2:
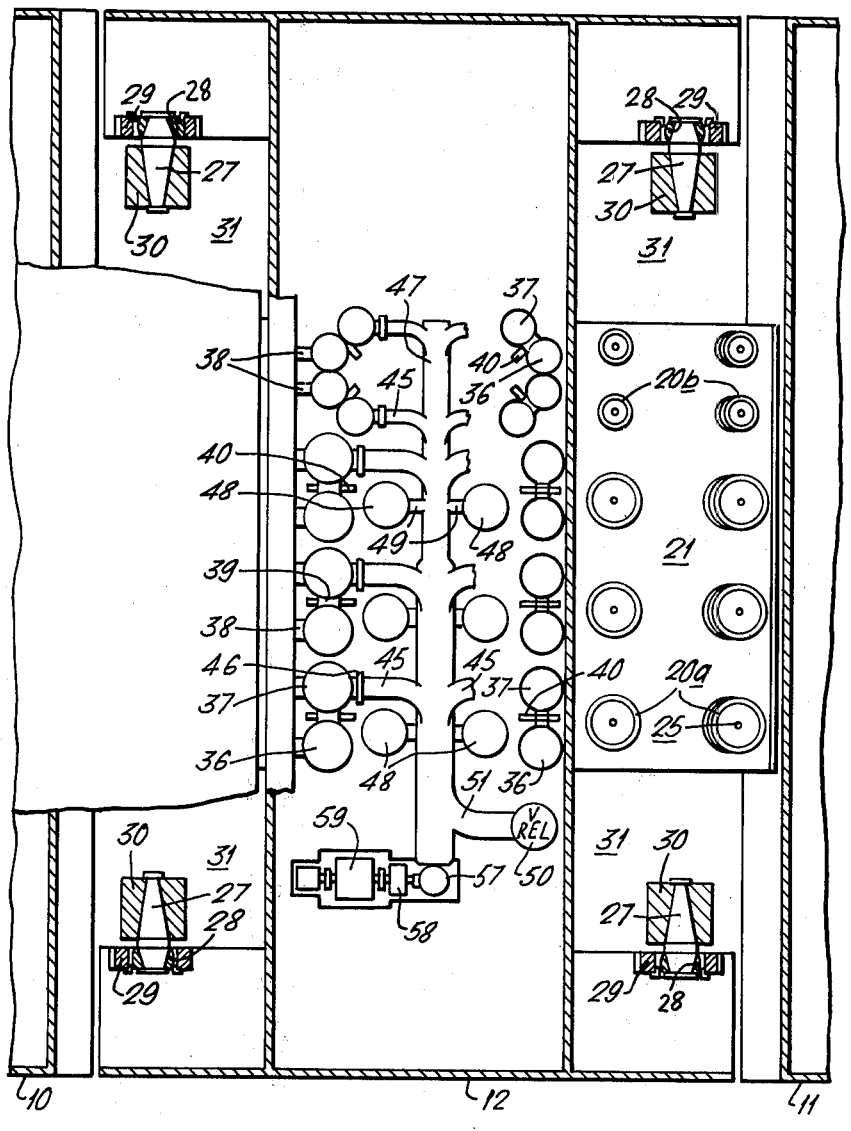
FIG. 2 shows a view in the direction of line II—II of FIG. 1.

Referring now to FIG. 1, the Cockerell Raft shown, incorporating the invention, comprises a leading pontoon 10, an aft pontoon 11 which is longer than the leading pontoon 10 and generally of rectangular form in elevation, and an intermediate pontoon 12. The leading pontoon 10 and the aft pontoon 11 are fabricated from ferro-concrete, whilst the intermediate pontoon 12 is of steel construction having a steel skin 13 and conventional structural steel reinforcement 14. Bulkheads 15 divide the leading pontoon 10 and the aft pontoon 11 into a number of watertight compartments 16.

Referring now to FIG. 2, the aft pontoon 11 is hinged to the intermediate pontoon 12 by two tapered stub shafts 27 each of which locates in a respective spherical bearing 28 held in a lug 29 from the intermediate pontoon 12 and in a projection 30 of the aft pontoon 11 which extends into a space 31 in the intermediate pontoon 12. The leading pontoon 10 is hinged to the intermediate pontoon 12 in a manner identical to that described in relation to the aft pontoon 11. Three pairs of large capacity single-acting pumps 20a and two pairs of smaller capcity single-acting pumps 20b are distributed along the junction between the leading pontoon 10 and the intermediate pontoon 12, and a similar number of pairs of pumps 20a and 20b are distributed between the aft pontoon 11 and the intermediate pontoon 12. Each pump 20a or 20b is connected by a duct 38 to a respective rectifying chamber 36 or 37, pairs of rectifying chambers 36 and 37 being connected together through an unloading valve 40 which when open allows liquid to pass freely between a pair of pumps 20a or 20b.

Each rectifying chamber 37 is connected by a branch duct 45 having a shut-off valve 46 to a common discharge manifold 47 which is closed at one end and has a stepped bore that increases in cross-section in a direction towards the open end of the discharge manifold 47 so as to arrange a substantially uniform rate of flow of liquid inside the discharge manifold 47. An accumulator 48 of the kind containing a trapped volume of air is connected to the discharge manifold 47 by a duct 49 at a position in advance of each respective branch duct 45, and a relief valve 50 is connected by a relief duct 51 to the discharge manifold 47 near the open end of the discharge manifold 47.

Referring now to FIG. 3, the discharge manifold 47 terminates in a downwardly directed bend 52 and connects to a tubular, variable pitch propellor turbine 53, generally known as a tubular Kaplan turbine as described for example in "HydroElectric Engineering Practice," pp 191, vol. 2, 2nd Edition, published by Blackie & Sons Ltd., Glasgow, Scotland. The turbine 53 has a conical outlet duct 54 extending below the bottom of the intermediate pontoon 12, and drives a shaft 55 connected by a coupling 56 to a bevel gearbox assembly 57 which provides a drive as shown in FIG. 2 through a flywheel 58 to an electric generator 59.

Referring again to FIG. 1 and also to FIG. 1a, two adjacent but displaced surfaces 21 and 22 of the intermediate pontoon 12 and the aft pontoon 11 respectively are inclined with respect to the lower surface of the intermediate pontoon 12. Two tubular bellows 23 and 24 of a pair of pumps 20a or 20b respectively disposed symmetrically about the axial centre of the respective stub shafts 27 are bonded at each end to, and extend between, the adjacent surfaces 21 and 22. The bellows 23, 24 provide flexible portions of the respective pumps 20a or 20b and are of a composite construction comprising rubber with fabric reinforcement.

The bellows 23 and 24 are closed at that end abutting the adjacent surface 22 of the aft pontoon 11 but are open at that end abutting the intermediate pontoon 12. An orifice 25 in the intermediate pontoon 12 connects the space inside each bellows 23 or 24 to the respective duct 38. Each rectifying chamber 36 and 37 has an inlet 78 for liquid in which the intermediate pontoon 12 floats (e.g. seawater) and is subdivided by an inner chamber 79, the inner chambers 79 of a pair of rectifying chambers 36 and 37 respectively being connectable through exhaust outlets controlled by the unloading valve 40 in a duct connecting the exhaust outlets. Each inner chamber 79 has non-return valves 80 for the flow of liquid from the inlet 78 to the duct 38 through the inner chamber 79 and non-return valves 81 for the flow of liquid from the duct 38 through the inner chamber 79 to a discharge chamber 84. The discharge chamber 84 of the rectifying chamber 36 is connected to a duct 39 which connects at its other end to the discharge chamber 84 of rectifying chamber 37 and which is connected to the branch duct 45 forming a discharge outlet, thus allowing the discharge from both discharge chambers 84 to pass to a single branch duct 45.

Two tubular bellows 23 and 24 respectively are bonded to adjacent but displaced surfaces 21 and 22 respectively of the leading pontoon 10 and the intermediate pontoon 12 and are connected to respective rectifying chambers 36 or 37 in a similar manner to that described above in relation to the aft pontoon 11 and the intermediate pontton 12.

In operation, relative motion in response to waves between the leading pontoon 10 and the intermediate pontoon 12, and the aft pontoon 11 and the intermediate pontoon 12 causes an oscillatory motion of the adjacent surfaces 21 and 22 but in an opposite angular direction with respect to each other so that the bellows 23 and 24 are cyclically extended and compressed by the adjacent surfaces 21 and 22 in an alternate manner. Each bellows 23 or 24 provides a pumping suction stroke when being extended and a pumping discharge stroke on being compressed so that liquid is alternately sucked into a bellows 23 or 24 through the duct means comprising inlet 78, inner chamber 79, duct 38 and orifice 25, and subsequently discharged through duct means comprising the orifice 25, duct 38 and inner chamber 79 to the discharge chamber 84. The liquid in the discharge chamber 84 of the rectifying chamber 36 discharges through a discharge outlet and the duct 39 to the discharge chamber 84 of rectifying chamber 37 from which liquid flows through a discharge outlet into the branch duct 45 and subsequently into the discharge manifold 47, where it is led to the turbine 53 through which it flows to the outlet duct 54, causing rotation of the turbine 53, and finally discharges below the intermediate pontoon 12. Rotation of the turbine 53 through the drive provided by the bevel gearbox assembly 57 produces rotation of the electric generator 59 which thereby provides an electric output. The flywheel 58 assists in smoothing the drive to the electric generator 59 whilst the accumulators 48 assist in smoothing the flow of liquid through the discharge manifold 47. In the event of an excessive pressure build-up in the discharge manifold 47, venting of liquid takes place through the relief valve 50.

In order to obtain optimum performance of the Cockerell Raft in accordance with the invention in a given sea state, the torques about the axial centres of the stub shafts 27 may be adjusted independently through use of the unloading valves 40 to provide a choice of the number of pumps 20a or 20b on load. Once an unloading valve 40 is opened there is virtually no pressure difference between a pair of associated pumps 20a or 20b and no torque is exerted by them.

It will be understood that although the invention has been described in relation to a Cockerell Raft having three buoyant members, the invention may be incorporated in wave power devices such as a Cockerell Raft having two members, for example two buoyant members or one buoyant member and a stationary member, or a plurality of buoyant members.

The invention has been described in relation to the use of a pair of symmetrically disposed bellows 23 and 24 at a position in the same vertical plane between two members which are movable with respect to each other in response to waves, but pairs of bellows 23 and 24 may be disposed in an alternate manner along the space between such members, or a single bellows 23 or 24 may be disposed on one side only of the hinge connecting two such members together.

Alternative materials may be used, for example for the leading pontoon 10, intermediate pontoon 12, the aft pontoon 11, and the bellows 23 or 24.

The pump of the invention may be provided with a pump body having a flexible portion of an alternative elastomer and reinforcement.

As an alternative to withdrawing liquid in which the device is arranged to float and displacing this liquid through a turbine, a closed cycle may be used so that the outlet from the turbine connects fluid to a reservoir for subsequent recycling by the pump.

It will be understood that the invention may be used to energise some other means of performing useful work from wave power as an alternative to the use of a turbine, for example a hydraulic motor.

We claim:
1. A device for extracting energy from sea waves and comprising:
(a) three pontoons aligned in series relationship;
(b) hinge means hingedly connecting adjacent pontoons in said series relationship;
(c) a platform provided by each pontoon at adjacent ends of the pontoons, adjacent said platforms being presented about the hinge axis of the respective hinge means and in opposing relationship to each other;
(d) a plurality of pump means distributed between adjacent pontoons, each pump means comprising a tubular bellows of rubber reinforced with fabric and having one end connected to one of the platforms and the other end thereof connected to the adjacent opposing platform, pairs of said pump means being disposed one each side of the hinge axis of the respective hinge means;
(e) a respective pump duct for each pump means, each said pump duct extending from a said pump means through one of the platforms to which said pump means is connected;
(f) a rectifying chamber for each pump means, each chamber having an inlet for the seawater in which the device is arranged to float, and a port for said seawater connected to said pump duct, and an outlet for seawater discharged from the pump means through the pump duct and the port;
(g) manifold means;
(h) branch duct means connecting each rectifying chamber to the manifold means;
(i) valve means disposed between the rectifying chambers of a said pair of pump means and connected to said rectifying chambers, said valve means being capable of connecting the said chambers so as to discharge one to another;
(j) turbine means to which the manifold means is connected; and
(k) electric generator means drivably connected to the turbine means.

2. A device for extracting energy from waves on a liquid, and comprising two members hinged one to another so as to allow relative motion between the members in response to waves, and a pair of pumps for displacing a liquid in response to said relative motion and connected between the members, one pump on each side of the centre about which the two said members are hinged, wherein the improvement comprises,
(a) each pump of said pair having a tubular body portion of bellows form and of flexible construction;
(b) two rectifying chambers, one for each said pump, each rectifying chamber having an inlet for a liquid to be pumped, a port for flow of the liquid between the rectifying chamber and the respective pump, an exhaust outlet for the liquid, and a discharge outlet for the liquid;
(c) a duct connecting each pump to the port of the respective chamber;
(d) a duct means connecting the exhaust outlets together; and
(e) a valve means in the duct means,
whereby, closure of the valve means in said duct means constrains the liquid discharged from the respective pump to the rectifying chamber thereof to discharge from the discharge outlet of the rectifying chamber, and opening the said valve means allows the liquid to exhaust through the exhaust outlet from the rectifying chamber to the other rectifying chamber.

3. A device for extracting energy from waves on a liquid and comprising two members hinged one to another so as to allow relative motion between the members in response to waves, at least one of the members being of buoyant construction, a plurality of pumps each including inlet and outlet means, each pump comprising a pump body having a pump chamber defined at least in part by a flexible portion of the pump body extending between the members so that the relative motion of the members varies the volume of the pump chamber and thereby displaces said fluid, a common manifold, a duct means for each pump for connecting said each pump to the common manifold so as to receive in the common manifold the fluid displaced by said each pump, exhaust means from the duct means for diverting the fluid discharged from at least one of said pumps away from the common manifold, and unloader valve means in said exhaust means for selectively opening and closing the exhaust means to unload and load said at least one pump.

* * * * *